(12) United States Patent
McCoy, Jr.

(10) Patent No.: US 11,235,696 B2
(45) Date of Patent: Feb. 1, 2022

(54) RETRACTABLE DAY CAB SLEEPER

(71) Applicant: Cleo McCoy, Jr., Streetsboro, OH (US)

(72) Inventor: Cleo McCoy, Jr., Streetsboro, OH (US)

( * ) Notice: Subject to any disclaimer, the term of this patent is extended or adjusted under 35 U.S.C. 154(b) by 46 days.

(21) Appl. No.: 16/562,553

(22) Filed: Sep. 6, 2019

(65) Prior Publication Data

US 2021/0070215 A1     Mar. 11, 2021

(51) Int. Cl.
*B60P 3/38*     (2006.01)
*A47C 17/80*     (2006.01)
*B60R 21/00*     (2006.01)

(52) U.S. Cl.
CPC .............. *B60P 3/38* (2013.01); *A47C 17/80* (2013.01); *B60R 2021/0034* (2013.01)

(58) Field of Classification Search
CPC ... B60P 3/38; A47C 17/80; B60R 2021/0034; B62D 63/025; B62D 33/0612
USPC ............................ 296/26.1, 190.02, 26.09
See application file for complete search history.

(56) References Cited

U.S. PATENT DOCUMENTS

| | | | | |
|---|---|---|---|---|
| 4,883,307 A * | 11/1989 | Hacker | ................ | B62D 35/001 296/180.2 |
| 5,310,239 A * | 5/1994 | Koske | ................ | B62D 33/0612 180/89.12 |
| 5,560,673 A * | 10/1996 | Angelo | .............. | B62D 33/0612 180/89.12 |
| 6,557,230 B1 * | 5/2003 | Gernstein | .......... | B62D 33/0612 29/401.1 |
| 6,625,860 B1 * | 9/2003 | Gernstein | .......... | B62D 33/0612 29/401.1 |
| 6,682,129 B2 * | 1/2004 | Baggett | .............. | B62D 33/0612 296/190.01 |
| 6,719,361 B1 * | 4/2004 | Adams | ................ | B62D 33/0612 296/190.01 |
| 7,232,179 B1 * | 6/2007 | Racz | .................. | B62D 33/0612 296/190.02 |
| 2006/0242762 A1 * | 11/2006 | Drummond | ............... | B60P 3/39 5/118 |

* cited by examiner

*Primary Examiner* — Pinel E Romain

(57) ABSTRACT

The inventor, Cleo McCoy Jr. provides a unique, sleeper unit giving commercial tractor day cab truck operators an option to upgrade their day cab from a sleeping birth to a roomy sleeper unit that retracts and expands. The Retractable Day Cab Sleeper is designed for truck operators who find sleeping births and birth modifications inadequate but don't want to upgrade to a permanent sleeper modification. The Retractable Day Cab Sleeper can also be installed and uninstalled using common tools with no modifications to the existing truck.

6 Claims, 25 Drawing Sheets

ITEM 6 FOR STEPPING UP TO THE TRUCK BED SEE SHEETS 40, 41

RETRACTED POSITION

Figure 11:
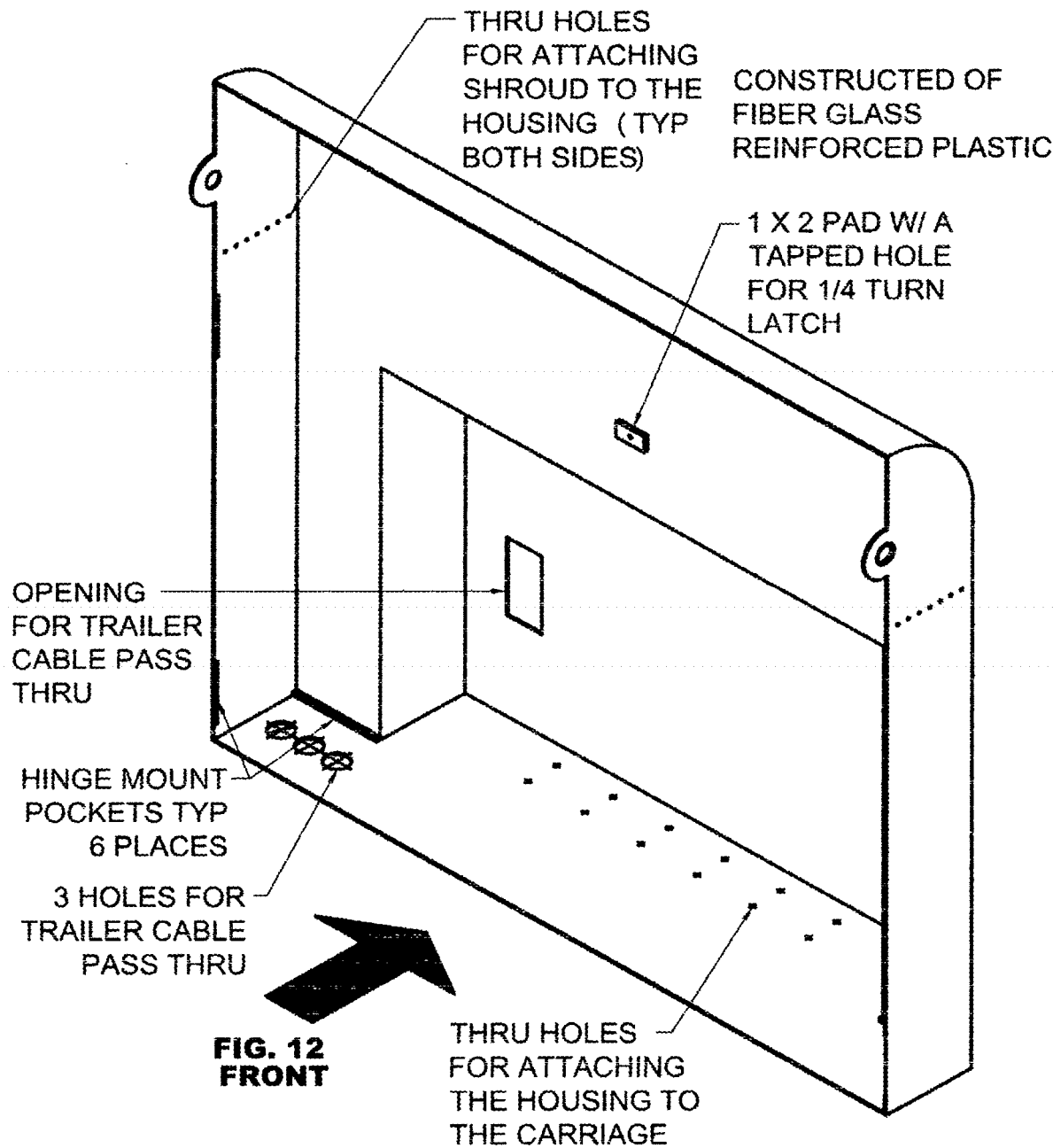

| MAIN ASSEMBLY | | | |
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

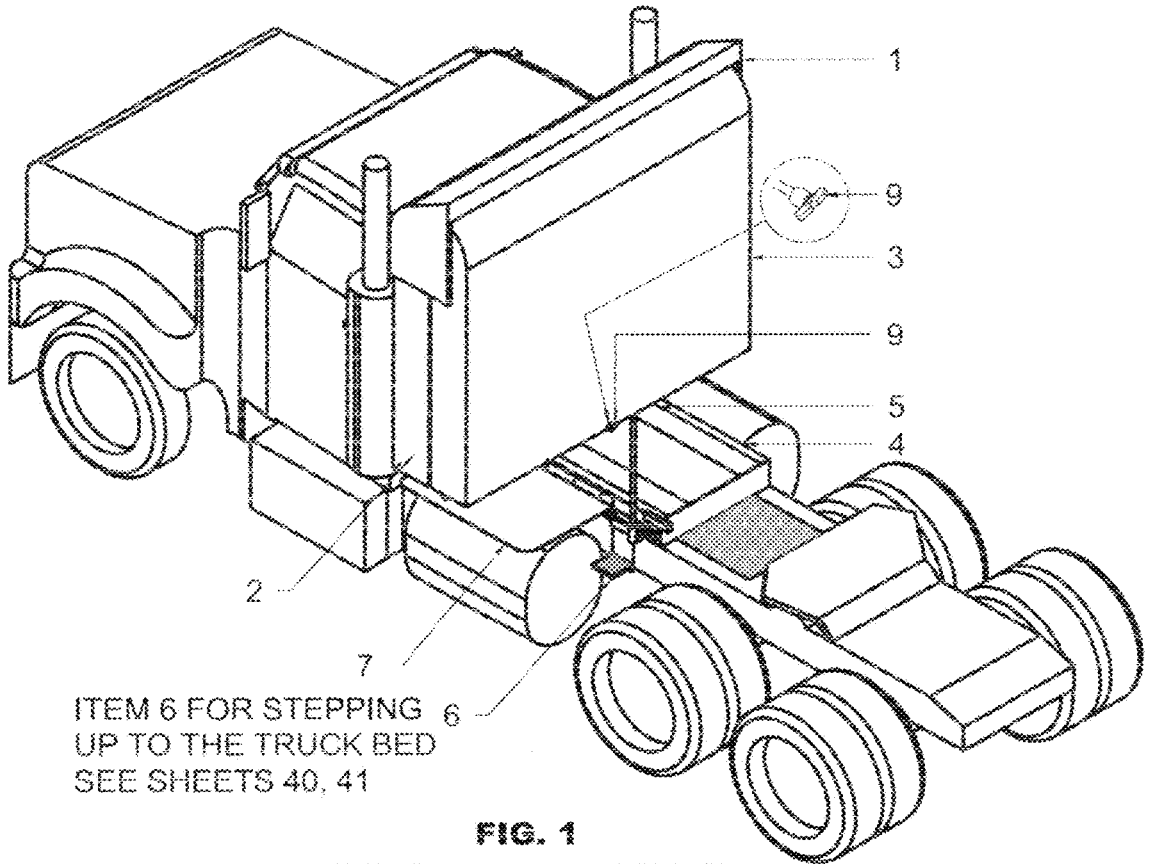

ITEM 6 FOR STEPPING
UP TO THE TRUCK BED
SEE SHEETS 40, 41

FIG. 1
RETRACTED POSITION

| MAIN ASSEMBLY ||||
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

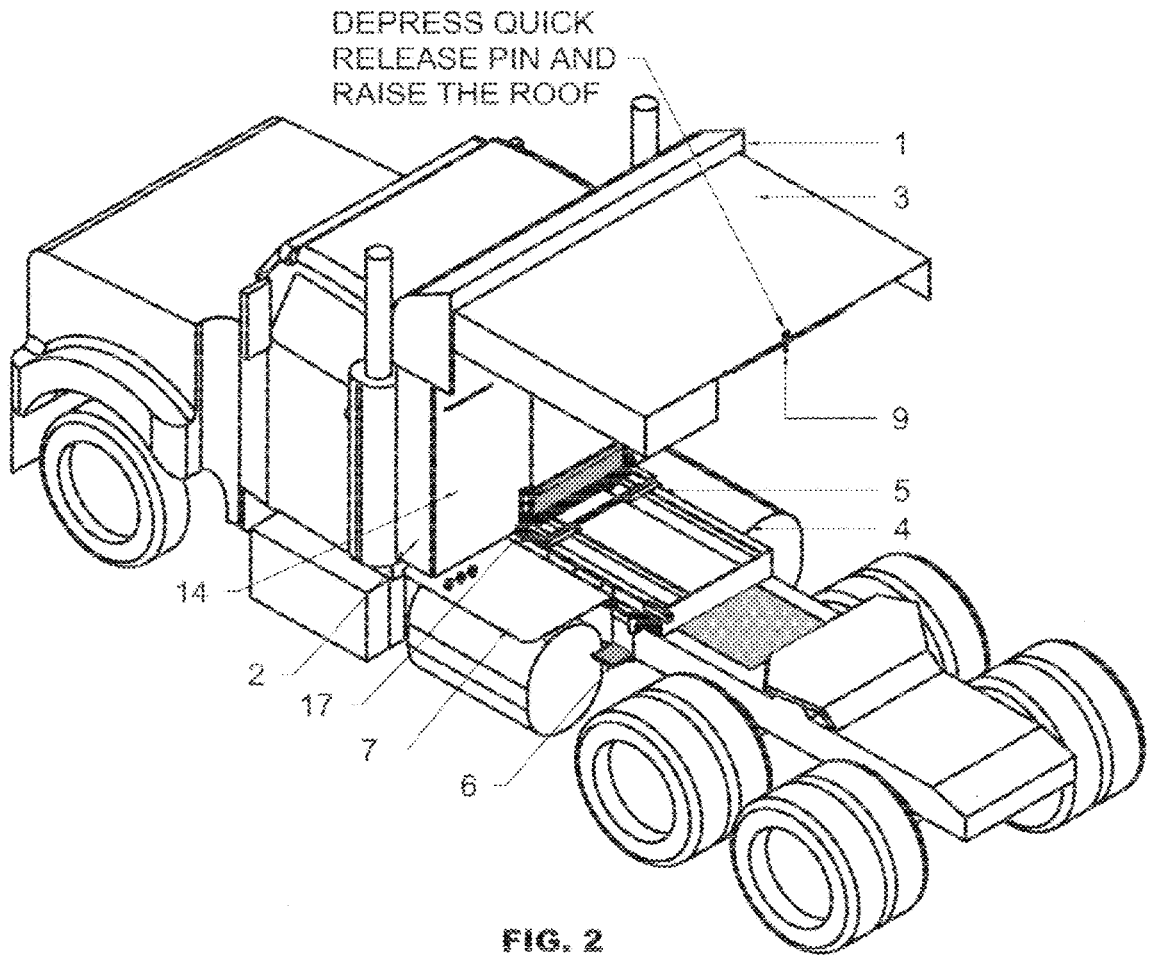

FIG. 2
FULLY RETRACTED ROOF UP POSITION

| MAIN ASSEMBLY | | | |
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

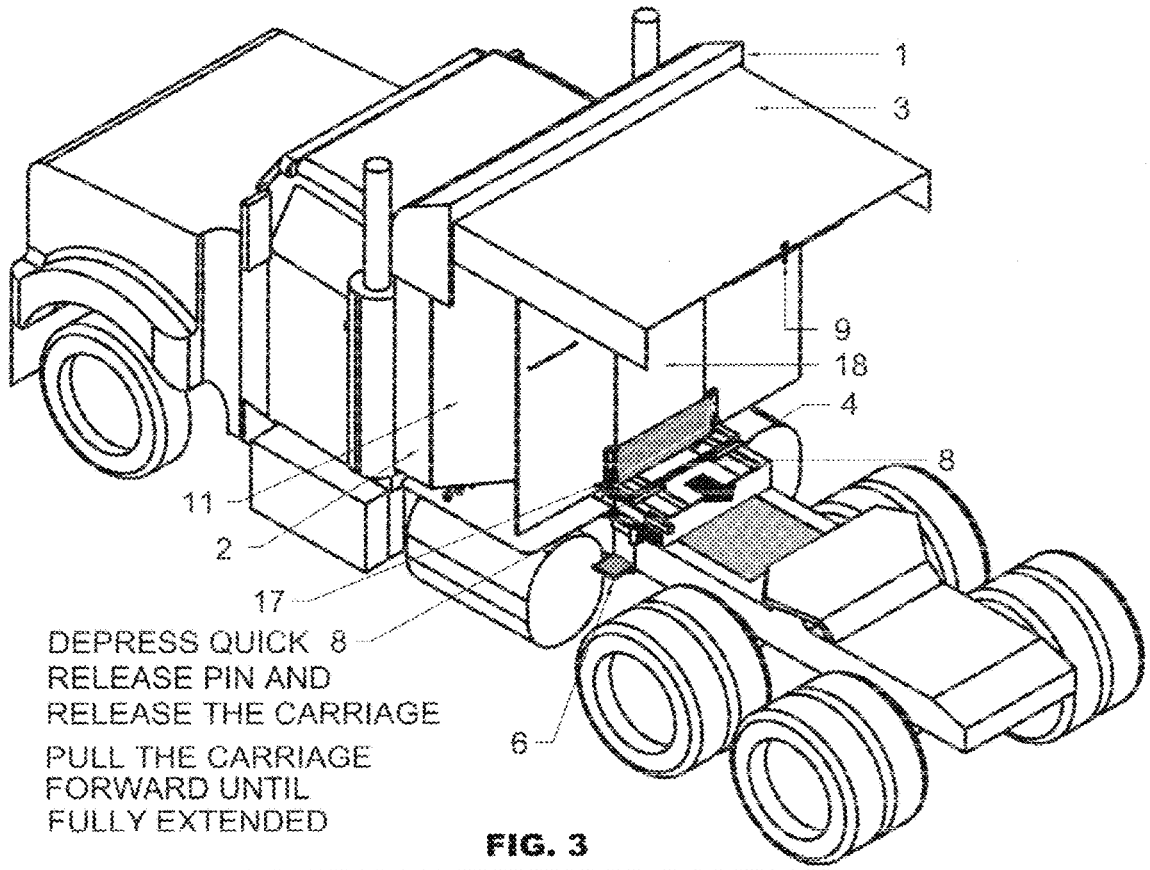

DEPRESS QUICK RELEASE PIN AND RELEASE THE CARRIAGE

PULL THE CARRIAGE FORWARD UNTIL FULLY EXTENDED

FIG. 3
PARTIALLY EXTENDED POSITION

| MAIN ASSEMBLY | | | |
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

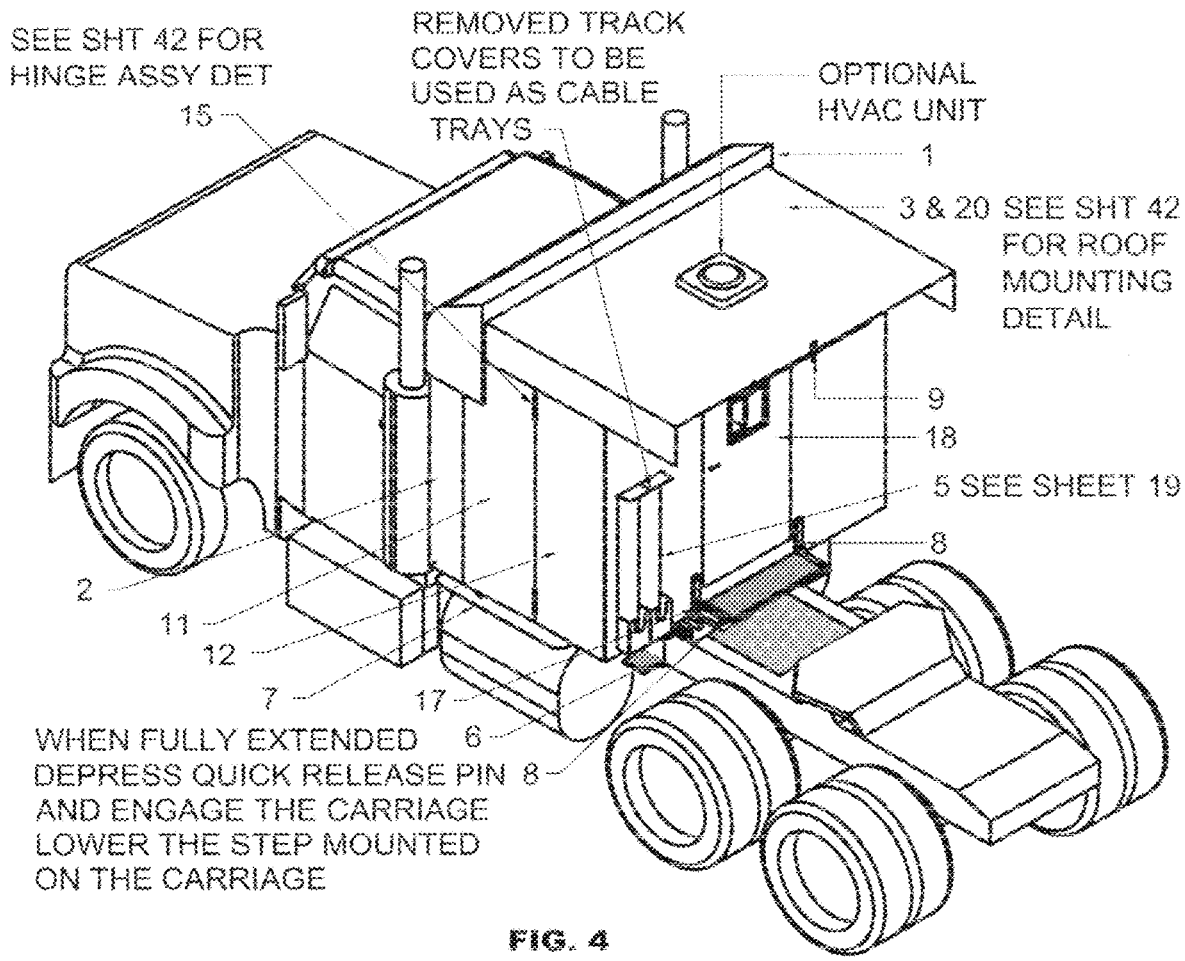

FIG. 4
FULLY EXTENDED POSITION - LEFT HAND SIDE VIEW

| MAIN ASSEMBLY | | | |
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

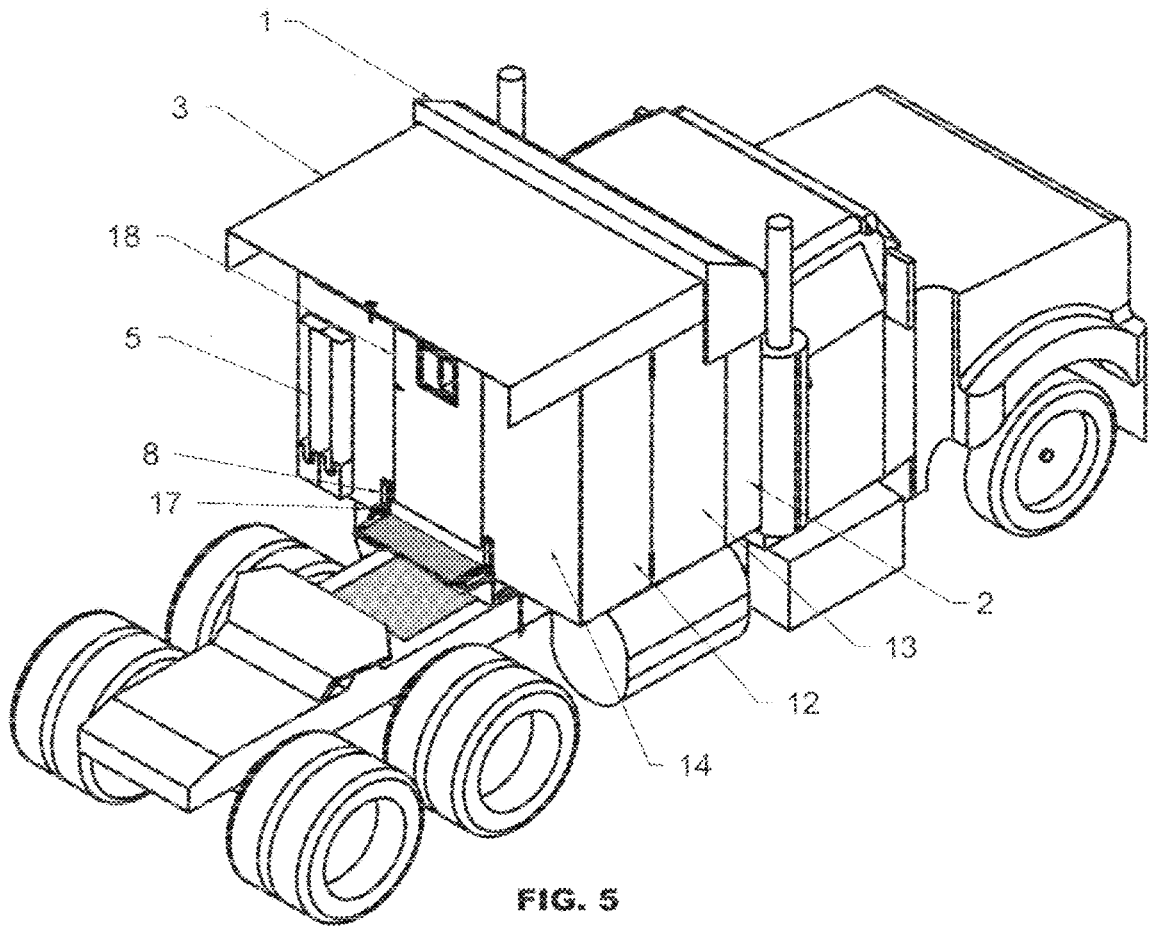

FIG. 5
FULLY EXTENDED POSITION - RIGHT HAND SIDE VIEW

| \multicolumn{4}{c}{MAIN ASSEMBLY} | | | |
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

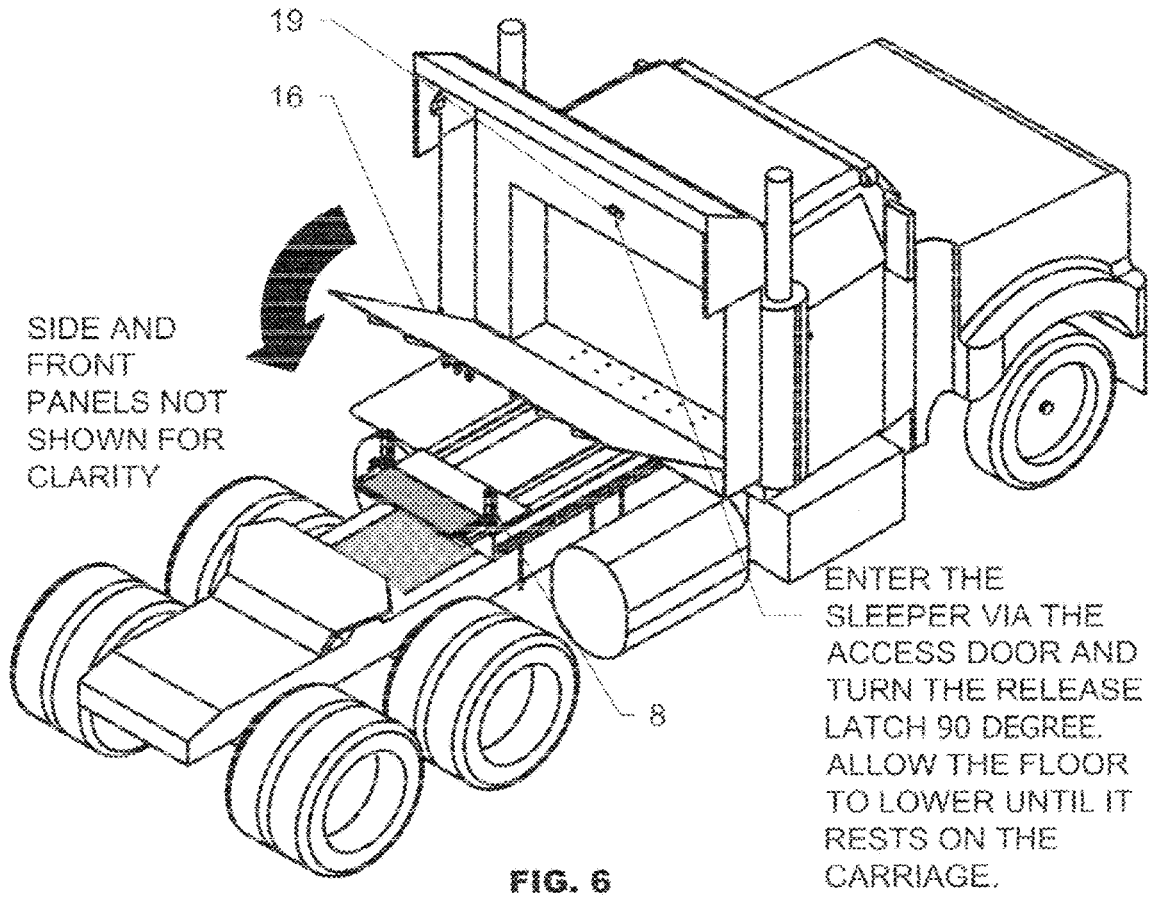

FIG. 6
FULLY EXTENDED POSITION - FLOOR OPERATION

| MAIN ASSEMBLY | | | |
|---|---|---|---|
| ITEM | DESCRIPTION | ITEM | DESCRIPTION |
| 1 | SHROUD | 11 | FOLDING WALL 2 - L.H. |
| 2 | HOUSING | 12 | FOLDING WALL 1 - R.H. |
| 3 | SWIVEL ROOF | 13 | FOLDING WALL 2 - R.H. |
| 4 | TRACK | 14 | SLIDING FRONT WALL PANEL |
| 5 | TRACK COVERS | 15 | HINGE ASSEMBLY |
| 6 | STEP AND GRAB BAR ASSY | 16 | FLOOR |
| 7 | CABLE TRAY | 17 | QUICK RELEASE CARRIAGE |
| 8 | CARRIAGE ASSEMBLY | 18 | ACCESS DOOR |
| 9 | QUICK RELEASE - ROOF | 19 | 1/4 TURN FLOOR LATCH |
| 10 | FOLDING WALL 1 - L.H. | 20 | SHAFT ROOF MOUNT |

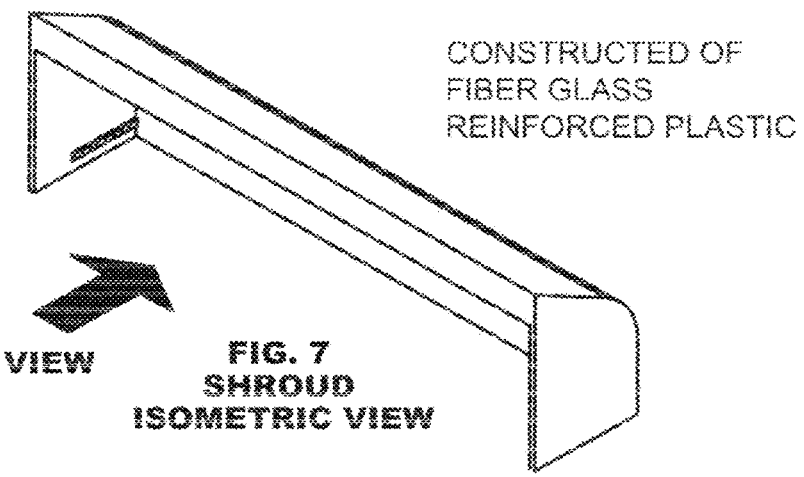
FIG. 8
SHROUD FRONT VIEW
FIG. 7
SHROUD ISOMETRIC VIEW
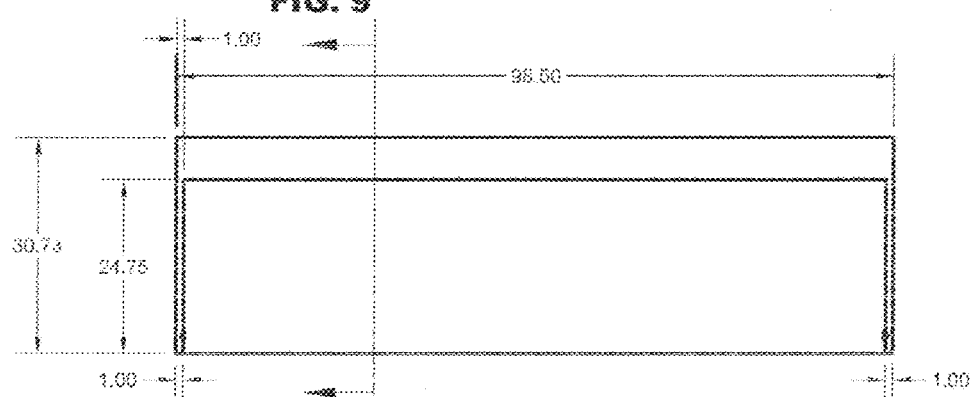
FIG. 8
SHROUD FRONT VIEW
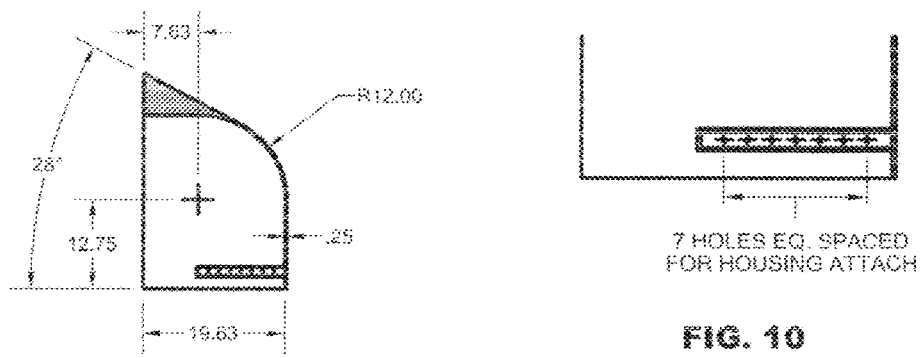
FIG. 9
SECTION VIEW - SHROUD
FIG. 10
MOUNTING HOLES DETAIL - SHROUD

HOUSING
ISOMETRIC VIEW

HOUSING FRONT

HOUSING - SECTION VIEW

HOUSING TOP**

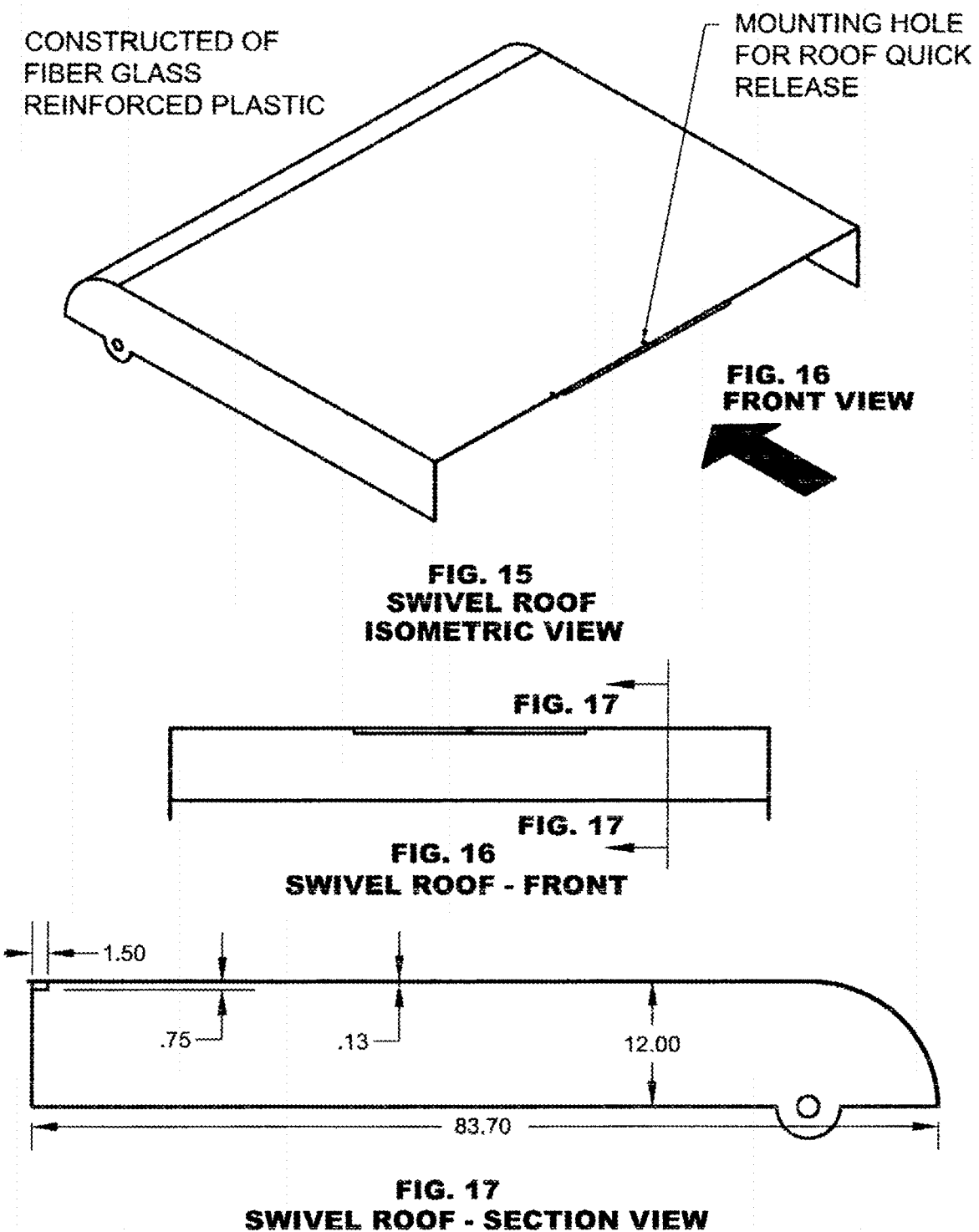

FOLDING WALL 1 - LEFT HAND
ISOMETRIC VIEW**

FOLDING WALL 1 - LEFT HAND
FRONT VIEW**

FOLDING WALL 2 - LEFT HAND ISOMETRIC VIEW

FOLDING WALL 2 - LEFT HAND FRONT VIEW

FOLDING WALL 1 - RIGHT HAND
ISOMETRIC VIEW**

FOLDING WALL 1 - RIGHT HAND
FRONT VIEW**

FOLDING WALL 2 - RIGHT HAND ISOMETRIC VIEW

FOLDING WALL 2 - RIGHT HAND FRONT VIEW

SLIDING FRONT WALL
ISOMETRIC VIEW**

SLIDING FRONT WALL
FRONT VIEW**

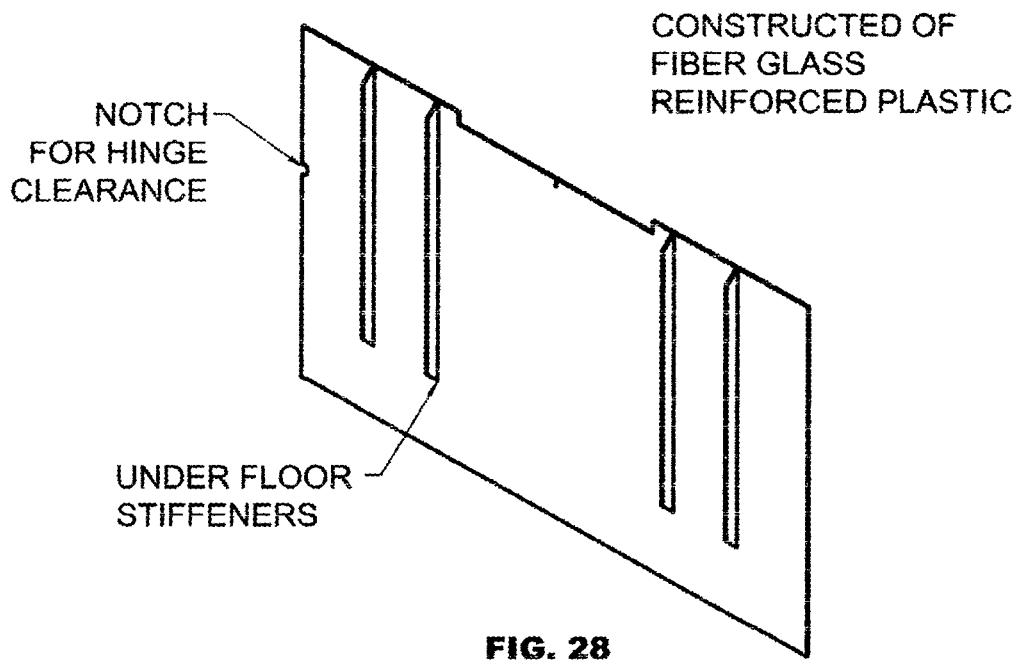
**FIG. 28
FLOOR
ISOMETRIC VIEW**
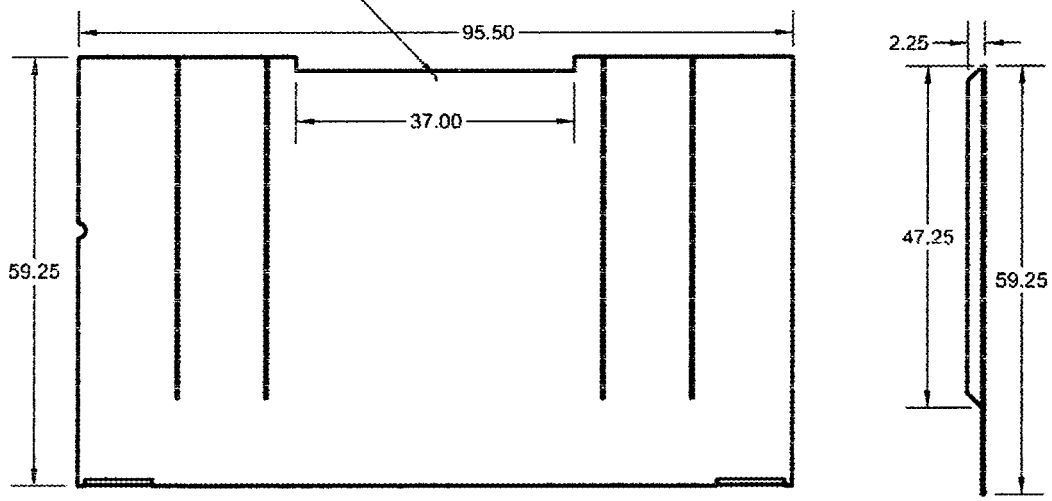
**FIG. 29
FLOOR
FRONT VIEW**
**FIG. 30
FLOOR
SIDE VIEW**

CARRIAGE ASSEMBLY
ISOMETRIC VIEW

| CARRIAGE ASSEMBLY | |
|---|---|
| ITEM | DESCRIPTION |
| 21 | STEP |
| 22 | HANDLE BAR-CARRIAGE |
| 23 | STEP SHAFT |
| 24 | SHAFT MOUNT-R.H. & L.H. |
| 25 | CARRIAGE |

CARRIAGE SIDE VIEW

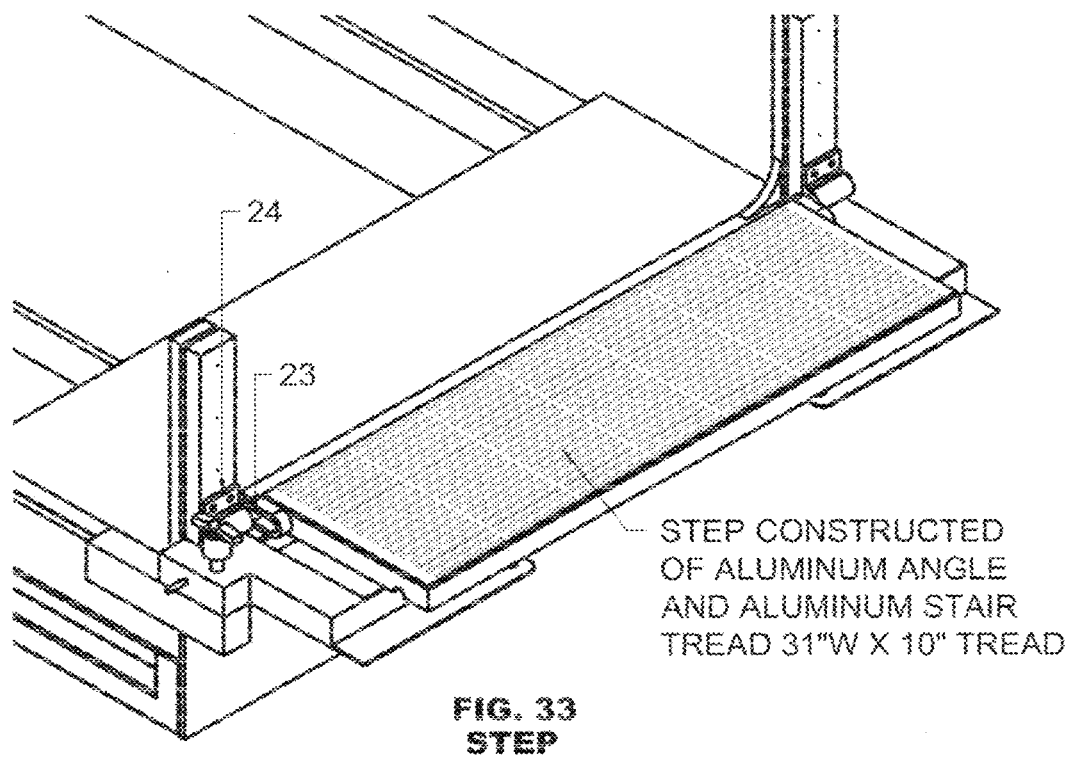
**FIG. 33
STEP
ISOMETRIC VIEW**
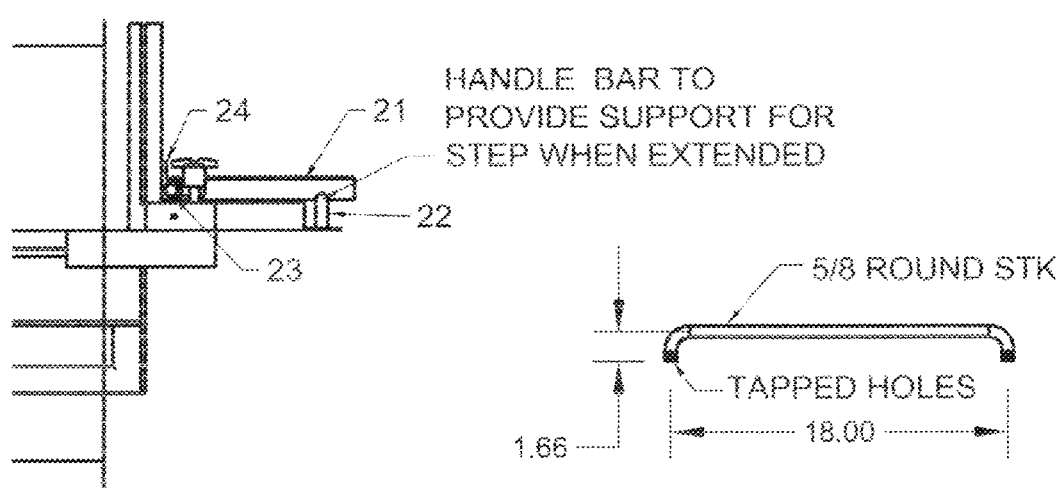
**FIG. 34
STEP SIDE VIEW**
**FIG. 35
HANDLE BAR - CARRIAGE
FRONT VIEW**

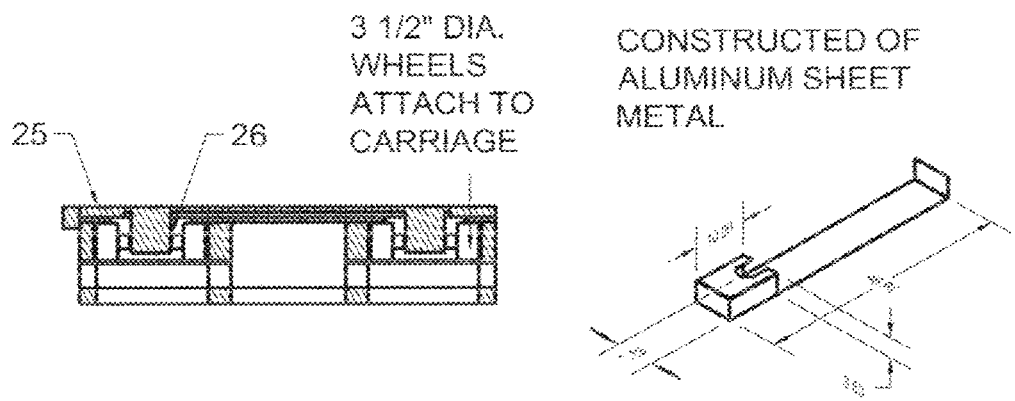
FIG. 36
CARRIAGE SECTION VIEW
FIG. 37
**TRACK COVER
& CABLE CRADLE
ISOMETRIC VIEW**
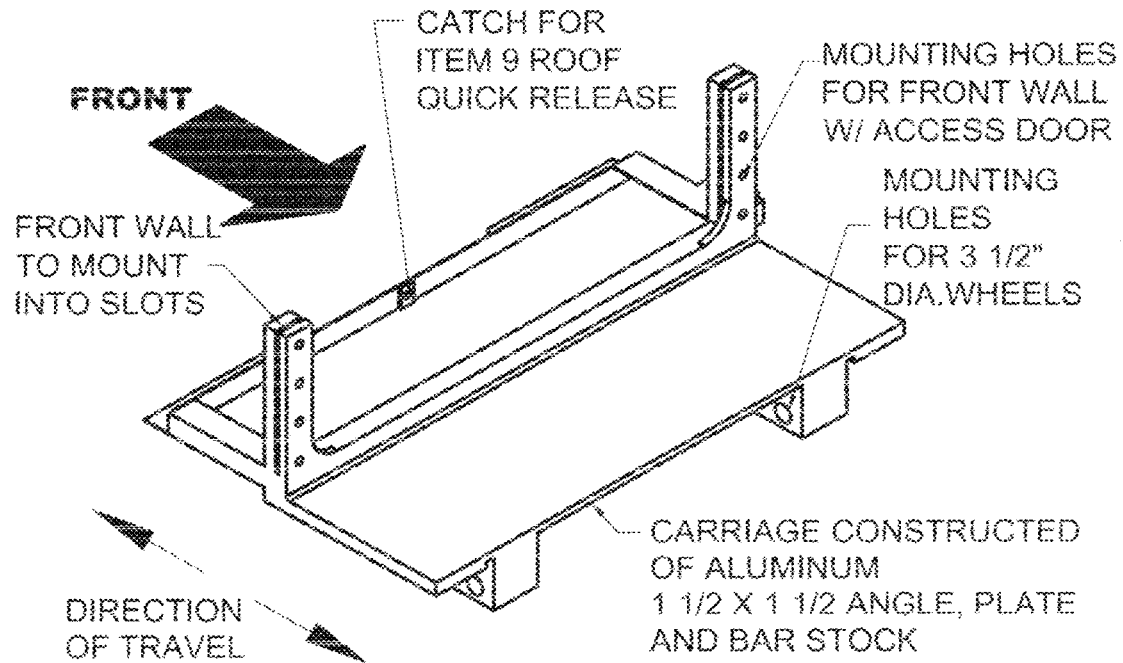
**FIG. 38
CARRIAGE WELDMENT
ISOMETRIC VIEW**

CARRIAGE FRONT VIEW

CARRIAGE SIDE VIEW

CARRIAGE TOP VIEW

TRACK
ISOMETRIC VIEW**

TRACK FRONT VIEW**

STEP AND GRAB BAR
ISOMETRIC VIEW

STEP AND GRAB BAR
ISOMETRIC VIEW

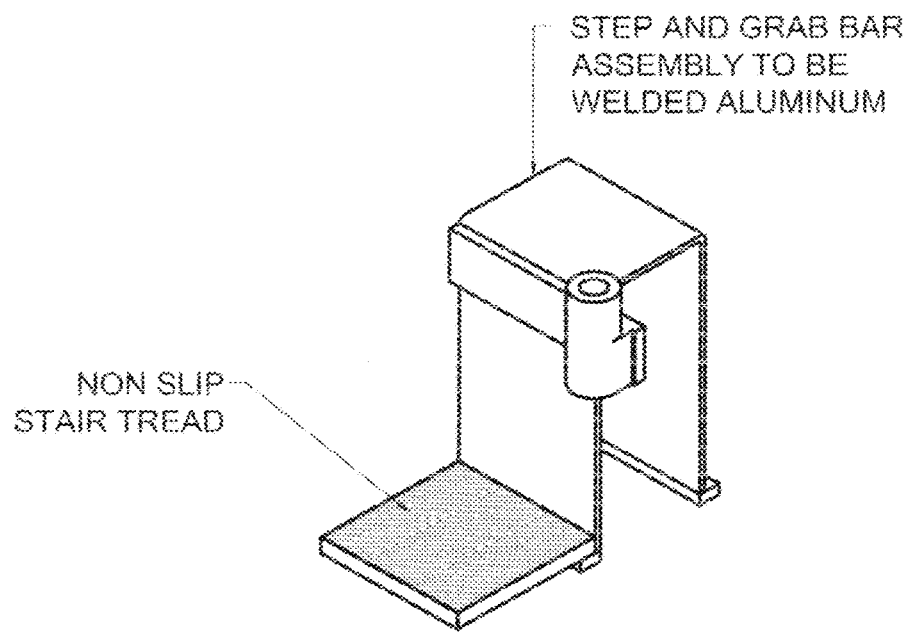
**FIG. 46
STEP AND GRAB BAR
ISOMETRIC VIEW**
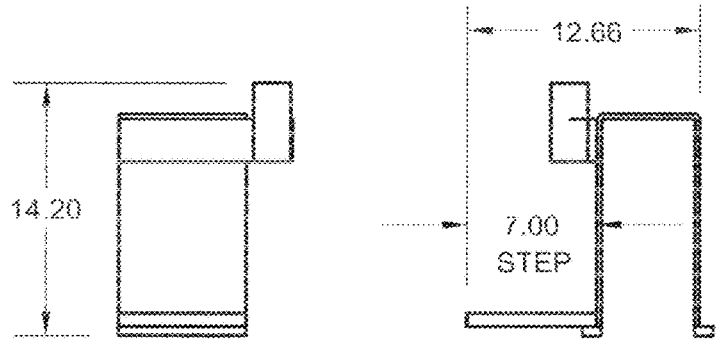
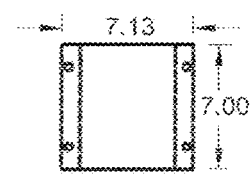
**FIG. 50
STEP AND GRAB
RETAINER TOP VIEW**
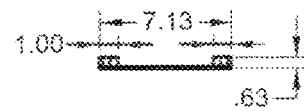
**FIG. 47
STEP AND GRAB
BAR FRONT VIEW**
**FIG. 48
STEP AND GRAB
BAR SIDE VIEW**
**FIG. 49
STEP AND GRAB
RETAINER FRONT
VIEW**

ROOF SHAFT
FRONT AND SIDE VIEWS

ROOF SHAFT
ASSEMBLY CROSS SECTION

HINGE ASSEMBLY
TYPICAL HINGE POCKETS
ISOMETRIC VIEW

RETRACTABLE DAY CAB SLEEPER

BACKGROUND OF INVENTION

The Retractable Day Cab Sleeper was invented to provide Day Cab Truck Drivers with an option for a sleeper that can provide greater sleeping area and potential comfort, while minimizing the overall weight penalty and loss of space that a sleeper of equal proportions would demand. The Retractable Day Cab Sleeper will provide the same service as existing sleepers such as, providing on demand rest without the need to use traditional lodging.

BRIEF SUMMARY OF INVENTION

The Retractable Day Cab Sleeper is designed for use with Tractor Truck Day Cab units. The Retractable Day Cab Sleeper provides the service of a permanent Day Cab Sleeper add on or an original equipment Day Cab sleeping birth, but with the following improvements: The Retractable Day Cab Sleepers usable space is, 5' wide×8' long×6.8' high ceiling when fully extended. This is a major improvement over existing Day Cab births and birth modifications which are typically in the range of 36" wide×6' long and ceiling height limited to the Cab's ceiling dimensions. The Retractable Day Cab Sleeper will be sold as an after market kit that an average truck operator can install with common tools. The Retractable Day Cab Sleeper will fill a market niche' for operators who find typical sleeping birth modifications inadequate and permanent sleeper additions too expensive.

BRIEF DESCRIPTION OF FEATURES

Figure 12:
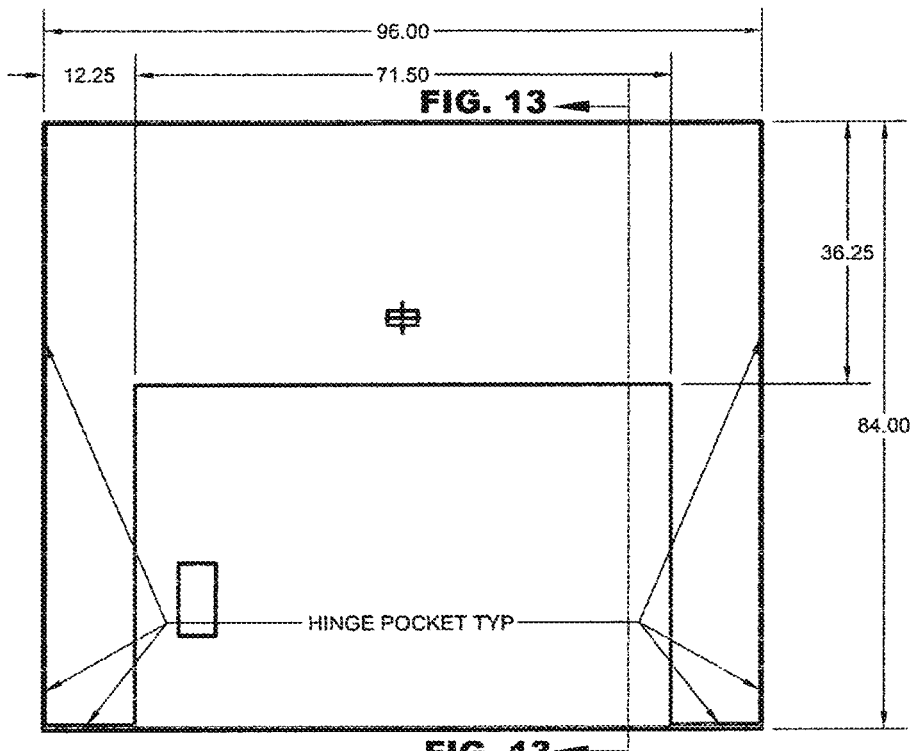
Figure 13:
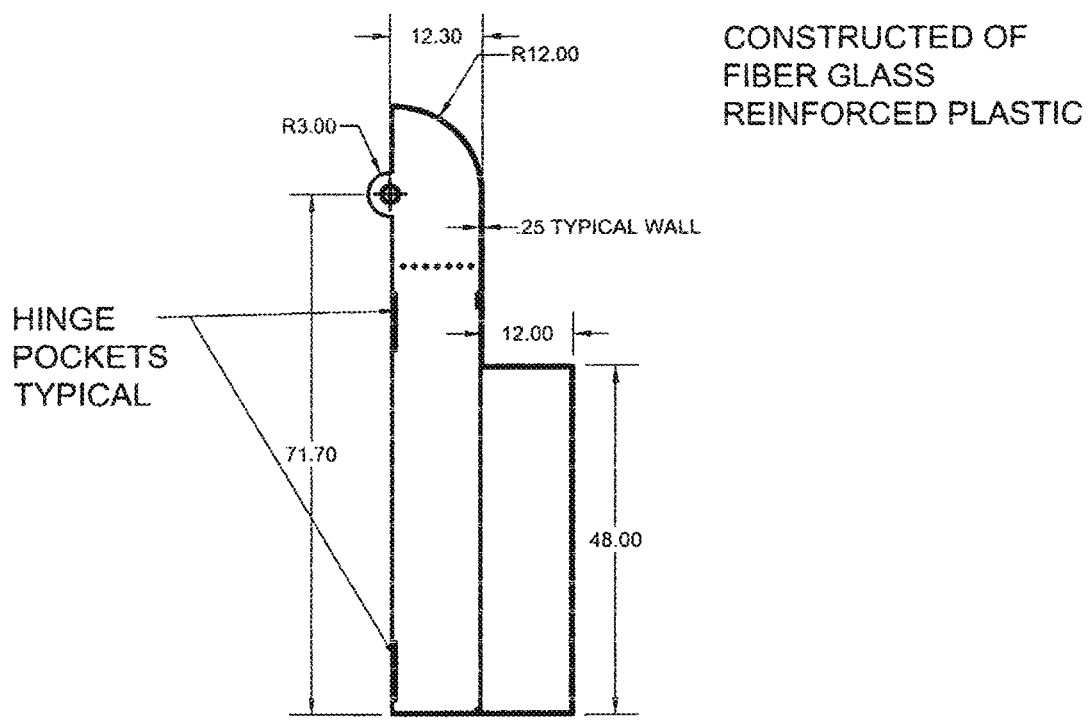
Figure 14:
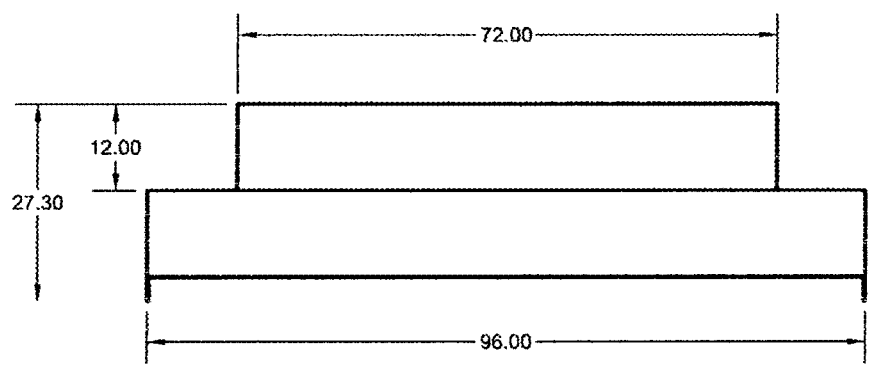
Figure 18:
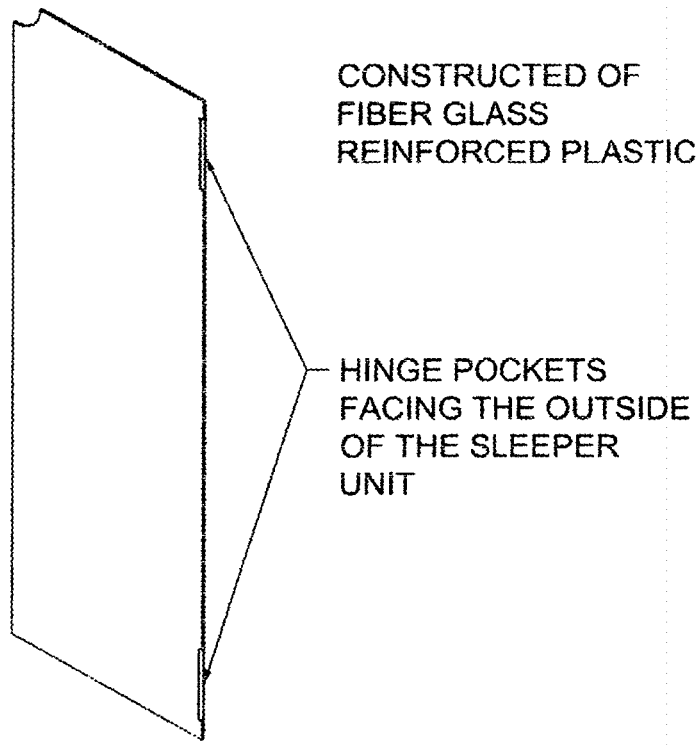
Figure 19:
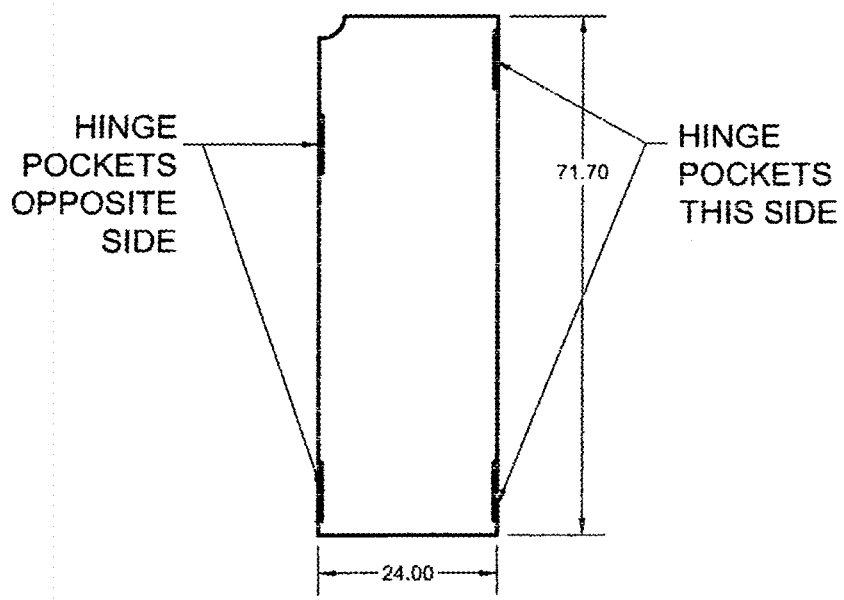
Figure 20:
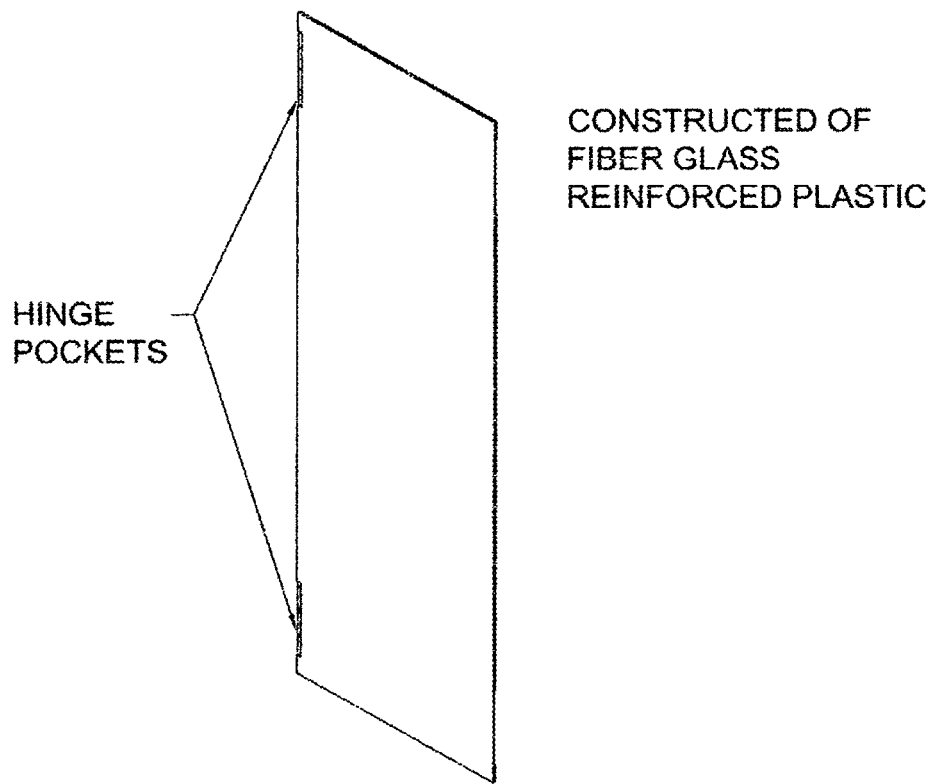
Figure 21:
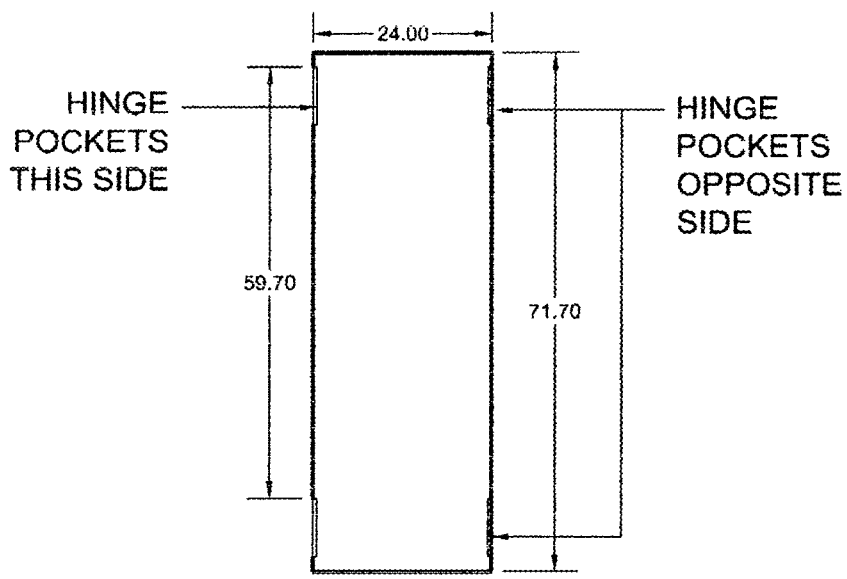
Figure 22:
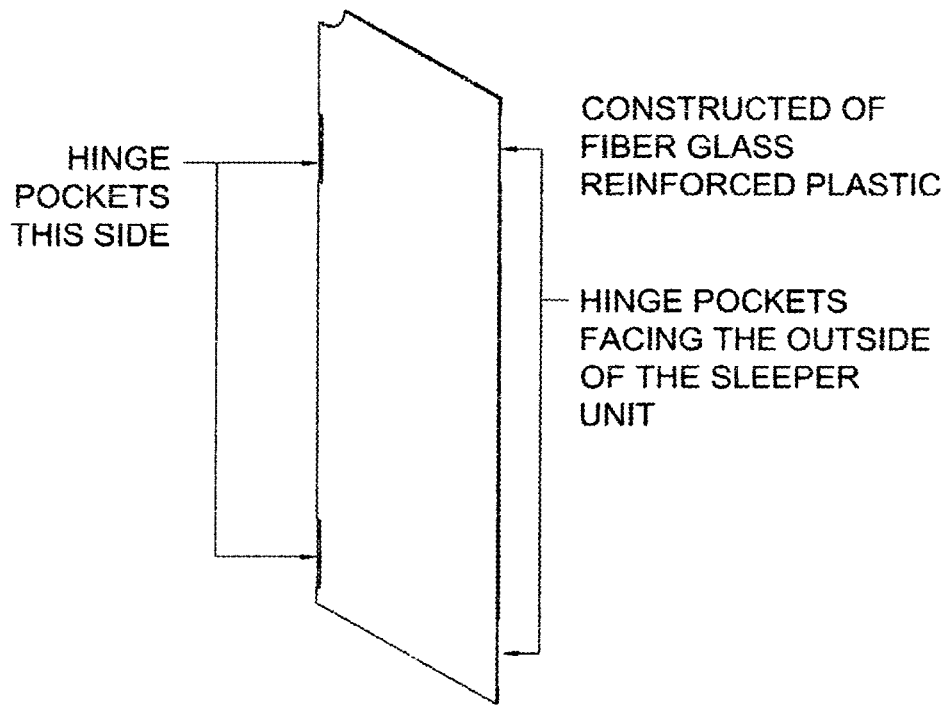
Figure 23:
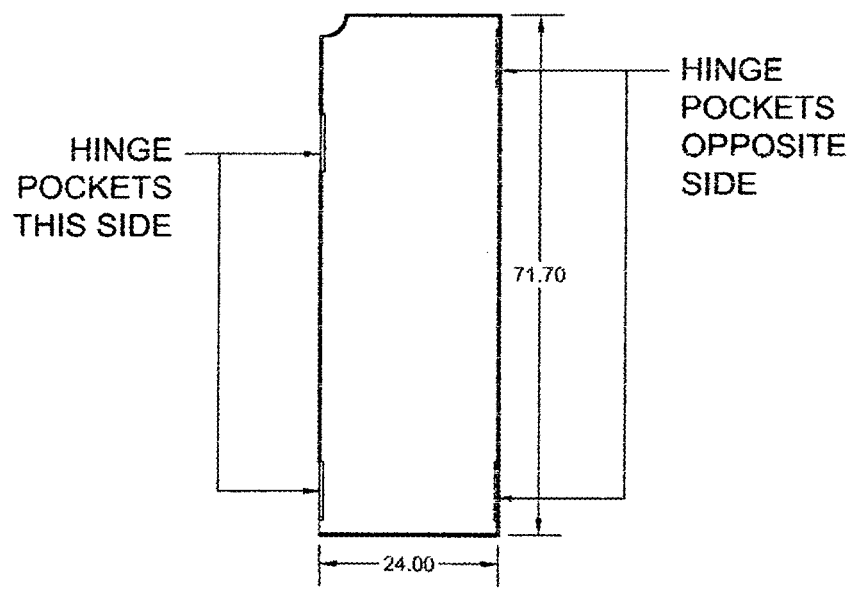
Figure 24:
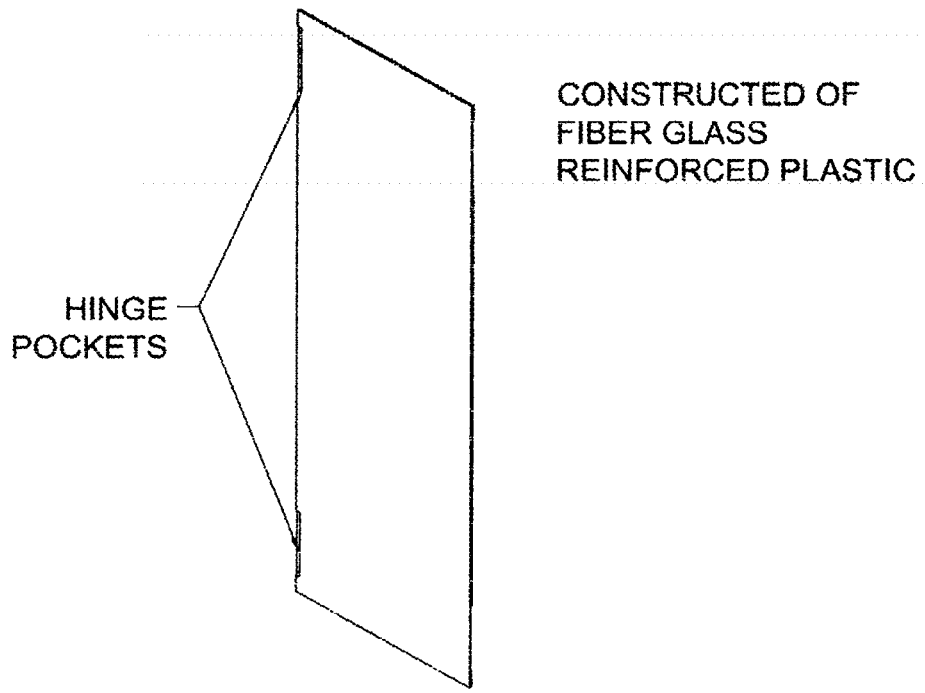
Figure 25:
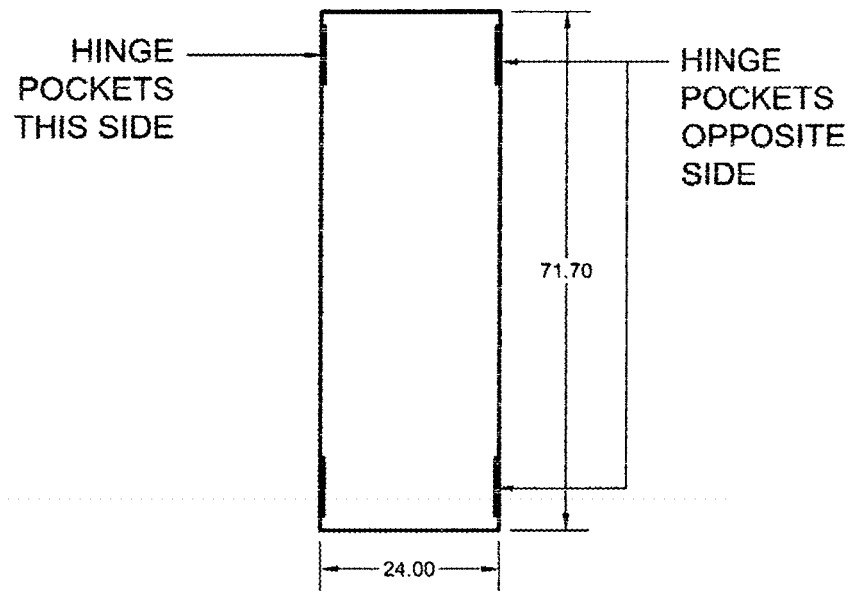
Figure 26:
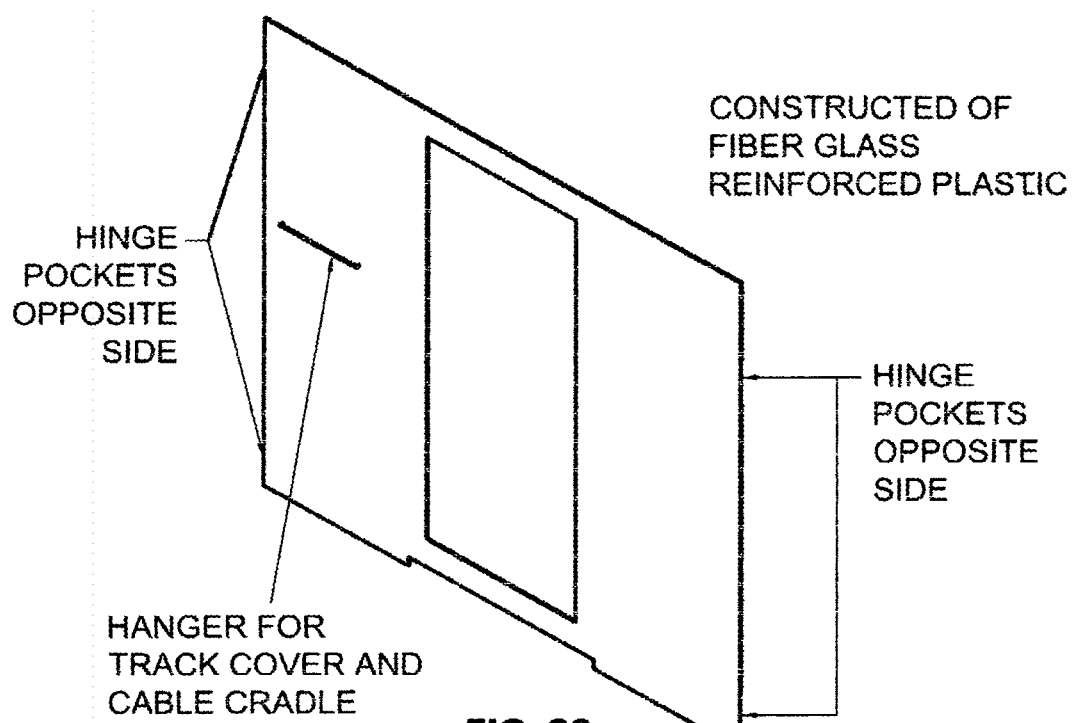
Figure 27:
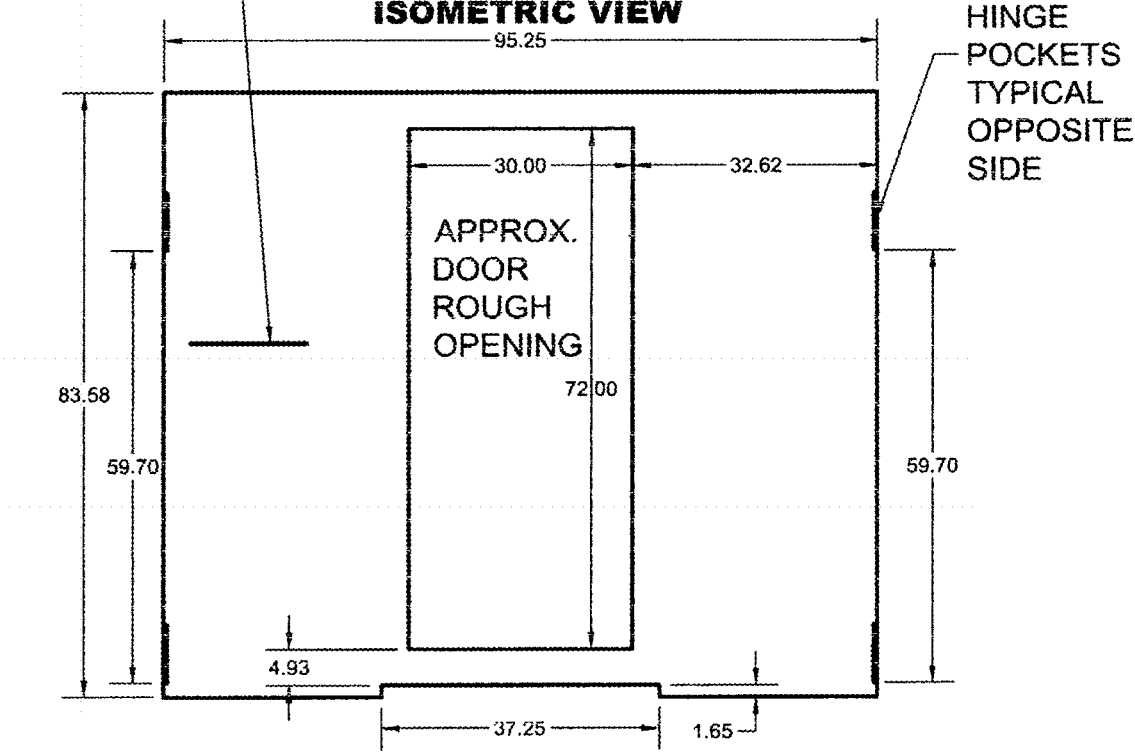
Figure 31:
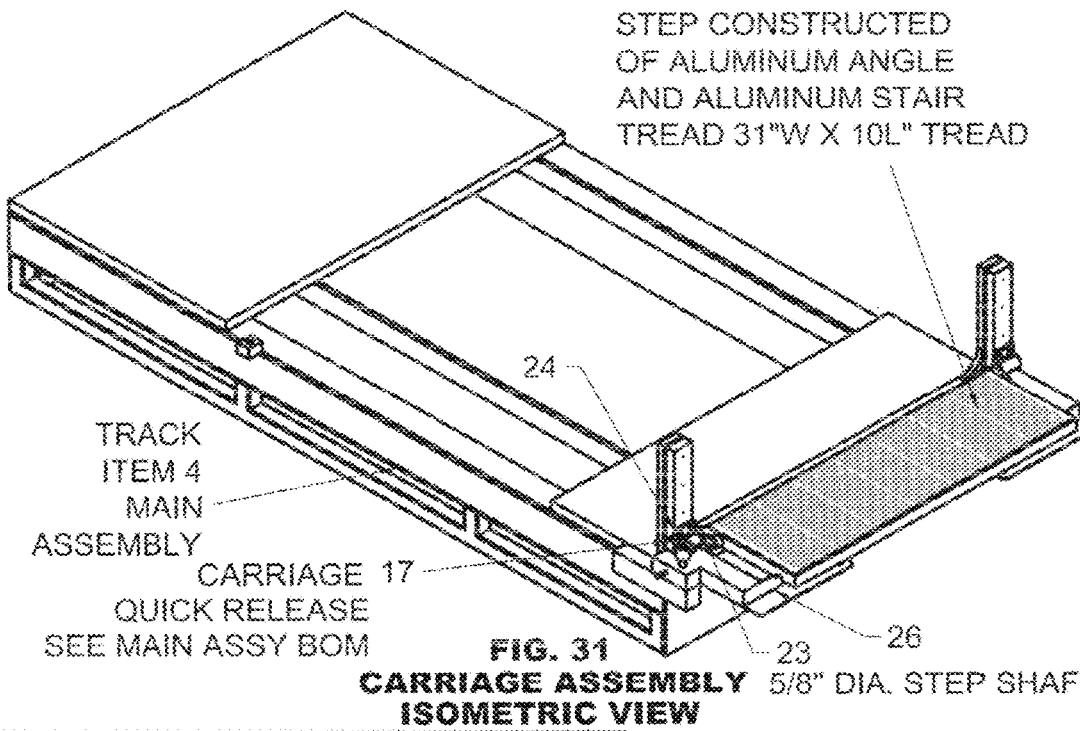
Figure 32:
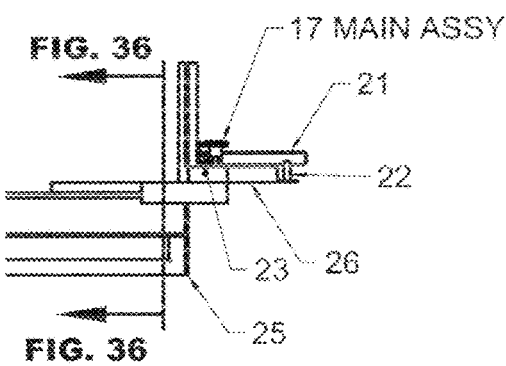
Figure 39:
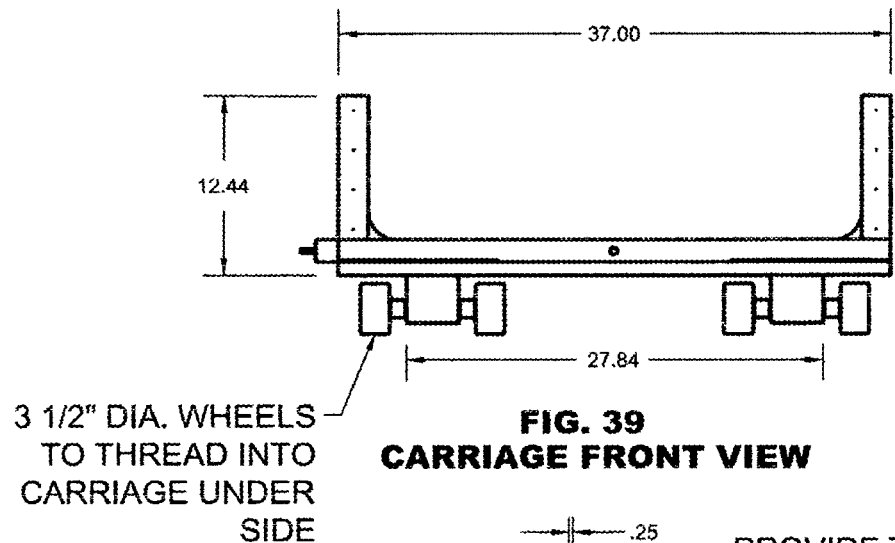
Figure 40:
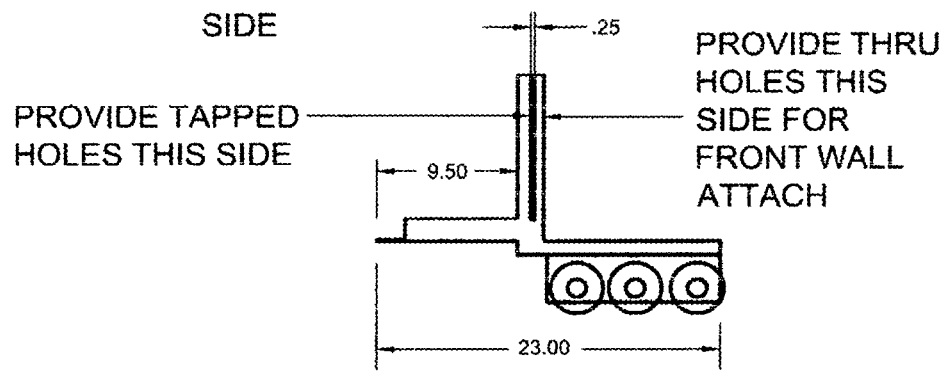
Figure 41:
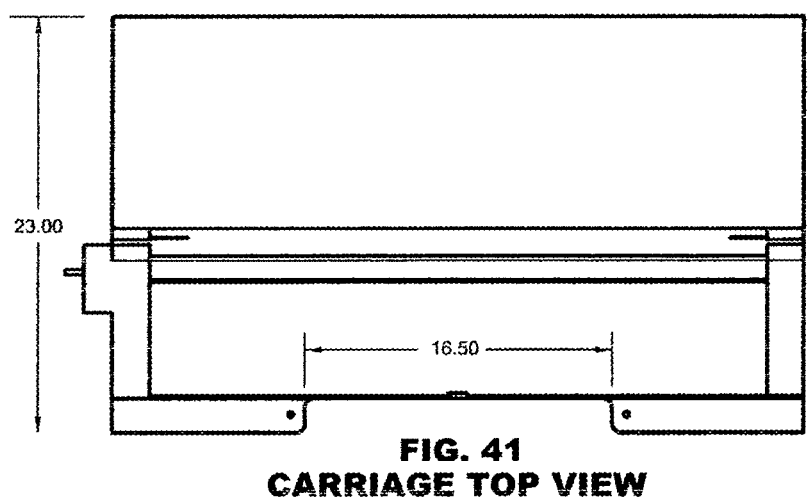
Figure 42:
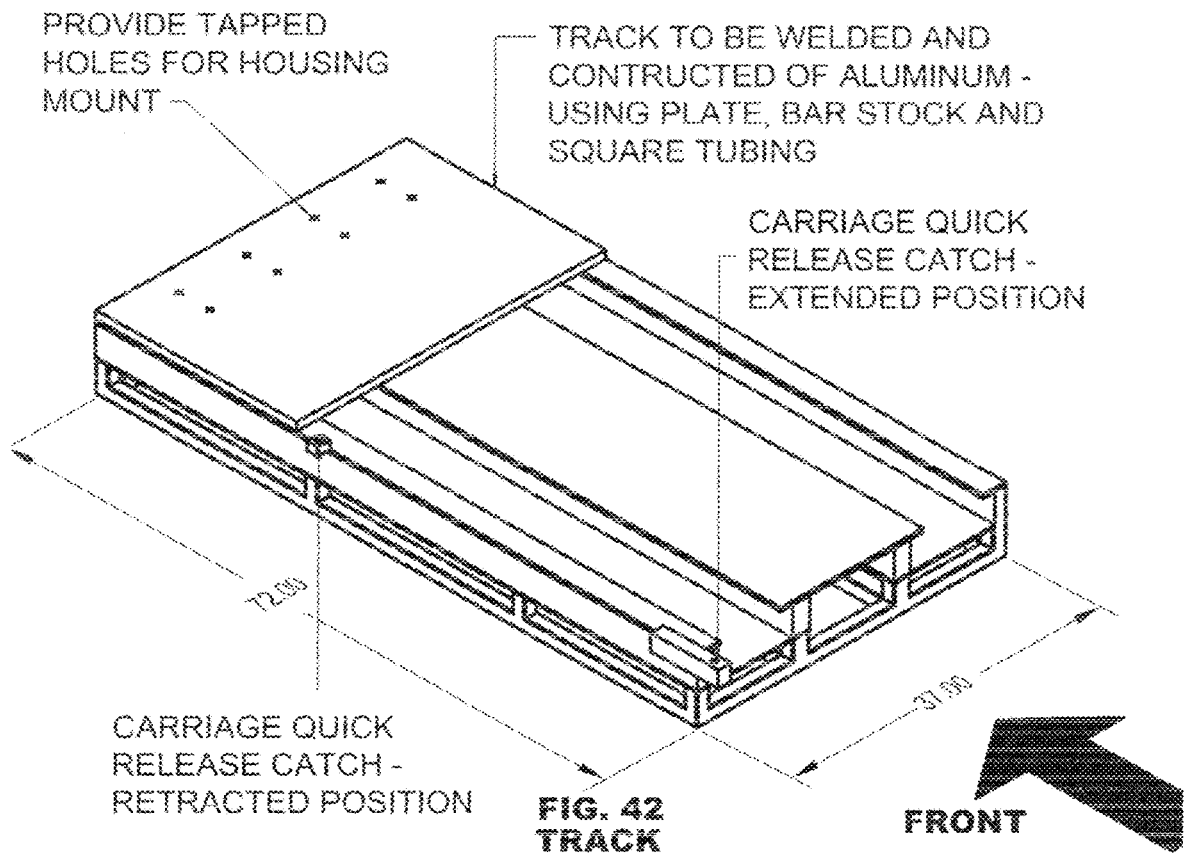
Figure 43:
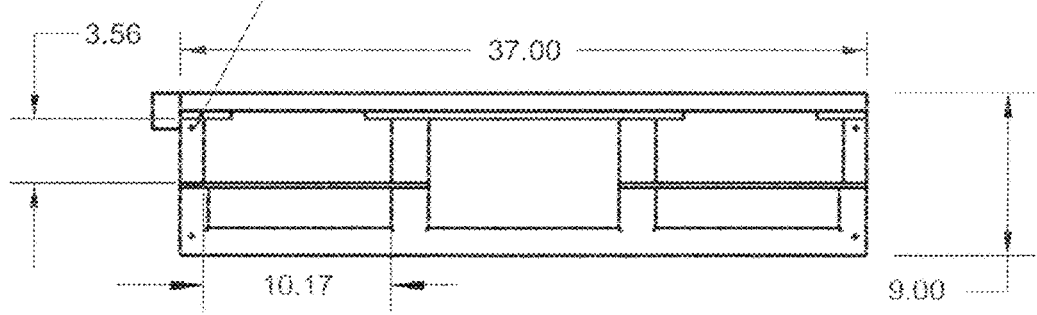
Figure 44:
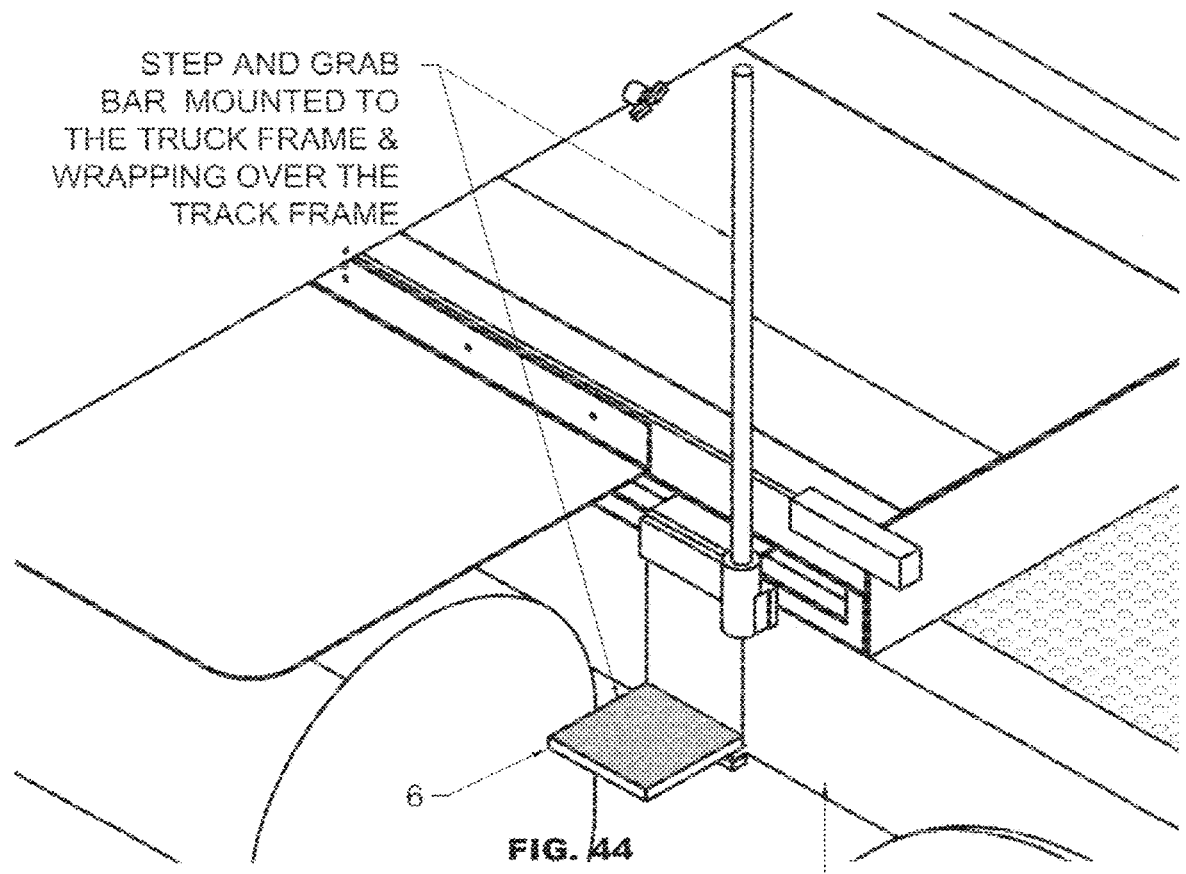
Figure 45:
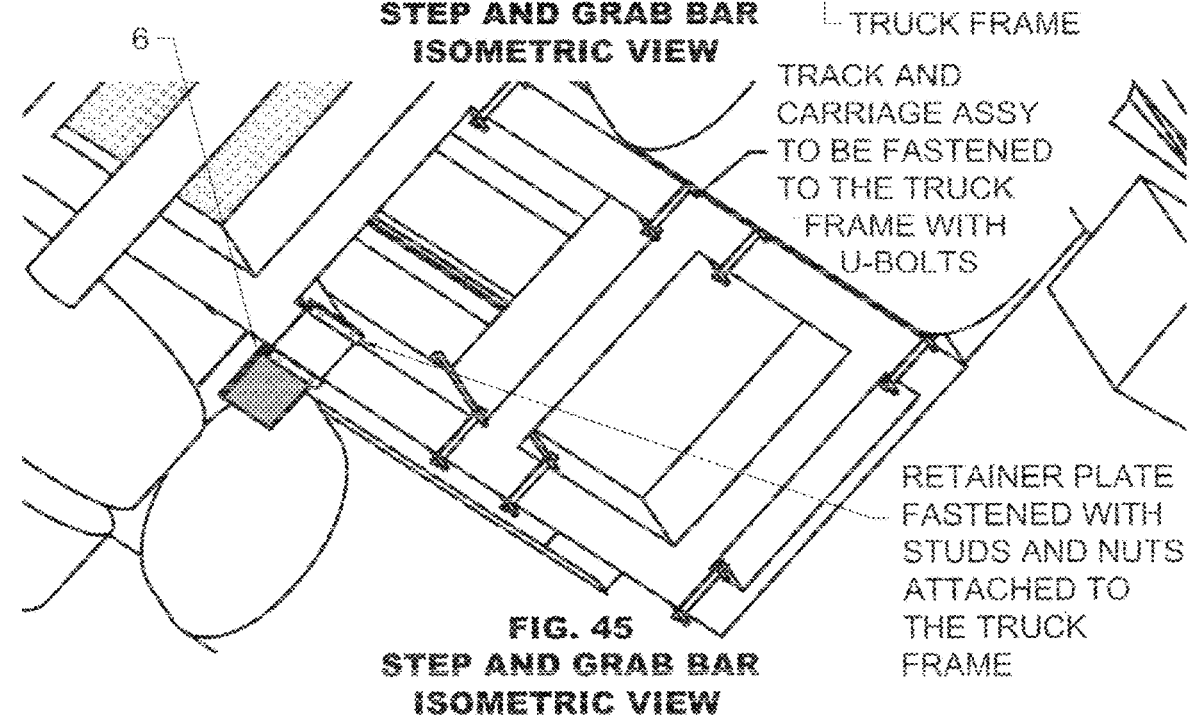
Figure 51:
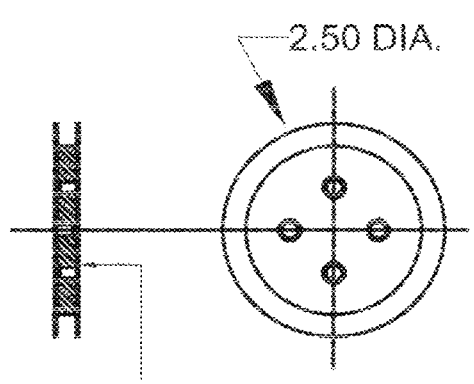
Figure 52:
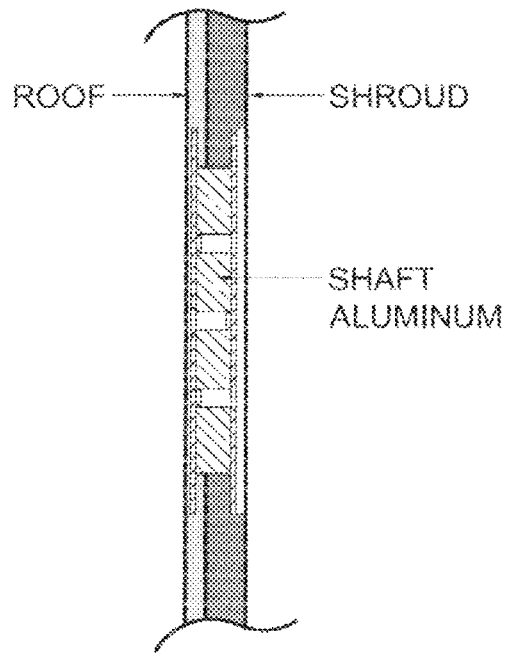
Figure 53:
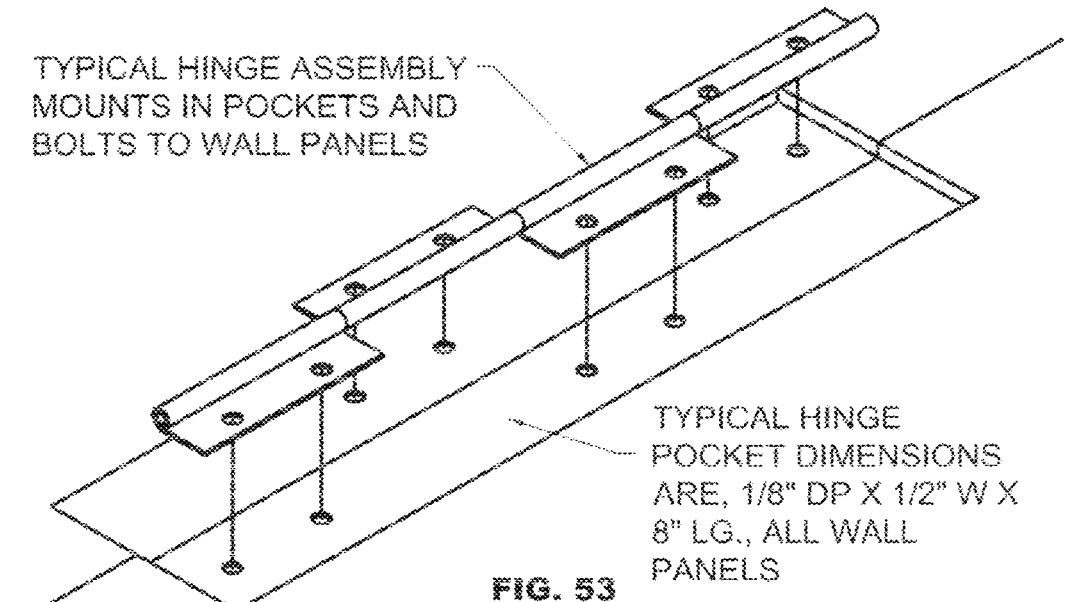

FIG. 1—Retracted Position (carriage and swivel roof locked, grab bar installed)
FIG. 2—Fully Retracted Roof Up Position (grab bar, item 6 removed)
FIG. 3—Partially Extended Position (operator pulling carriage toward him)
FIG. 4—Fully Extended Position—Left Hand Side View (step to access door lowered)
FIG. 5—Fully Extended Position—Right Hand Side View (track covers hung)
FIG. 6—Fully Extended Position—Floor Operation (floor lowers 90 degrees into a level position)
FIG. 7—Shroud Isometric View—Shroud protects the swivel roof attachment)
FIG. 8—Shroud Front View
FIG. 9—Section View—Shroud
FIG. 10—Mounting Holes Detail—Shroud
FIG. 11—Housing Isometric View (Main structure that bolts to the track)
FIG. 12—Housing Front
FIG. 13—Housing Section View
FIG. 14—Housing Top
FIG. 15—Swivel Roof Isometric View—(Swivel roof rotates up and down 90 degrees)
FIG. 16—Front View
FIG. 17—Roof Section View
FIG. 18—Folding Wall 1 L.H. Isometric View (Walls fold or open during retraction and extension)
FIG. 19—Folding Wall 1 L.H. Front View
FIG. 20—Folding Wall 2 L.H. Isometric View
FIG. 21.—Folding Wall 2 L.H. Front View
FIG. 22.—Folding Wall 1 R.H. Isometric View
FIG. 23.—Folding Wall 1 R.H. Isometric View
FIG. 24—Folding Wall 2 R.H. Isometric View
FIG. 25—Folding Wall 2 R.H. Front View
FIG. 26—Sliding Front Wall Panel Isometric View (Wall slides away from cab or towards it)
FIG. 27—Sliding Front Wall Panel Front View
FIG. 28—Floor Isometric View (Designed for strength and is light weight)
FIG. 29—Floor Front View
FIG. 30—Floor Side View
FIG. 31—Carriage Assembly (Slides in the track and provides retract and extend function)
FIG. 32—Carriage Side View
FIG. 33—Step (Step can be folded up during retracted position)
FIG. 34—Step Side View
FIG. 35—Handle Bar—Carriage Front View (used by the operator to retract or extend the sleeper)
FIG. 36—Carriage Section View
FIG. 37—Track Cover & Cable Cradle (used to protect the track and provide cable management)
FIG. 38—Carriage Weldment
FIG. 39—Carriage Front View
FIG. 40—Carriage Side View
FIG. 41—Carriage Top View
FIG. 42—Track (Provides a linear guide for the carriage to move in)
FIG. 43—Track Front View
FIG. 44—Step and Grab Bar View (The operator uses this to climb up on the truck frame)
FIG. 45—Step and Grab Bar View
FIG. 46—Step and Grab Bar View
FIG. 47—Step and Grab Bar Front View
FIG. 48—Step and Grab Bar Side View
FIG. 49—Step and Grab Retainer Front View
FIG. 50—Step and Grab Retainer Top View
FIG. 51—Roof Shaft Front and Side Views (This is the mounting shaft for the Swivel Roof)
FIG. 52—Roof Shaft Assembly Cross Section
FIG. 53—Hinge Assembly Typical Hinge Pockets (Connects the folding panels)

DETAILED DESCRIPTION OF INVENTION

The Retractable Day Cab Sleeper, invented by Cleo McCoy Jr. is constructed of lightweight components such as, fiber glass reinforced plastic and aluminum. The sleeper features collapsible side walls attached to a front wall with an access door. The front wall is attached to a sliding carriage which moves in a track. The side walls are attached to the front wall and to the housing via anodized aluminum hinges. While the truck is in motion the sleeper is fully retracted and locked down. When the truck is not in motion and the operator is planning to rest, the sleeper unit can be unlocked and fully extended, then locked down again. The operator can then make use of the steeper unit.

The Retractable Day Cab Sleeper compartment has a housing, see item 2, FIG. 1, with a protective shroud attached, see item 1, FIG. 1. Inside the shroud and attached to the housing is the swivel roof, see item 3, FIG. 1. The shroud provides protection for the swivel roof mounting and also provides improved air flow for reduced fuel consumption. The swivel roof is attached to the housing with item 20, shaft roof mount, see FIGS. 49 and 50 and rotates a maximum of 90 degrees from a vertical closed position, see FIG. 1, to a raised horizontal position, see FIG. 2. In the retracted position, see FIG. 1, the roof is locked into the carriage assembly, see FIG. 29.

The carriage assembly rides on radial bearing wheels inside an aluminum track, see item 4, FIG. 36. The carriage assembly FIGS. 29 and 30, has a handle bar, item 22, FIG. 30 attached and also has a front wall panel, see item 14, attached to it and using item 15, hinge assembly FIG. 53, the front wall panel is also attached to items 10, 11, 12, and 13, folding wall panels 1 and 2, L.H. and R.H. and to the housing. The sliding front wall panel has an access door for the operator to enter the sleeping compartment. When fully retracted, the folding wall panels are stored in the housing in a folded position.

The housing is fixed and is attached to the track. The track is firmly bolted to the truck frame using U-bolts, see FIG. 35. A step and grab bar assembly is also provided to assist the operator when stepping up to the sleeper, see item 6, FIG. 44. The step and grab bar assembly also have the dual function of securing the track to the truck frame along with the U-bolts.

The Retractable Day Cab sleeper will also feature customer specified options such as HVAC roof top unit to provide heating or cooling and insulating capabilities, see FIG. 5. A cable tray is also provided, item 7, FIG. 1, which mounts to the track and provides a support for cable management.

Operational Description of the Retractable Day Cab Sleeper

The operator first places the grab bar into the step and grab bar assembly and using the grab bar to steady himself, steps up onto the truck frame. The operator must remove the grab bar from the step and grab bar assembly so the carriage assembly is free of obstructions. The operator then removes item 5, FIG. 35, track cover and cable cradle. The operator unlocks the roof using item 9, quick release roof and swivels it into an upward horizontal position, see FIG. 2. The operator then unlocks the carriage assembly from the track using item 17, quick release-carriage and using item 22, handle bar, begins pulling the carriage toward him. Pulling the carriage toward the operator causes the side wall panels to unfold. When the operator reaches the limit of the carriage travel, he can then lock the carriage in the extended position using item 17, quick release-carriage. The front wall panel has an access door and a retractable step made of aluminum. The step is in the up position when the sleeping unit is retracted. When the unit is fully extended the step can be lowered to a horizontal position and will rest on item 22, handle bar. This will provide the operator safe and easy access to the sleeping area. Once the step is lowered and the access door opened, the operator can turn item 19, ¼ turn floor latch and release the floor. The operator can slowly lower the floor of the sleeper until it contacts the rear top plate of the track and the top of the locked carriage. The sleeper is now ready for use by the operator. The operator then takes the brake and trailer lighting cables and places them in item 5, track cover and cable cradle, see items, 5 and 14.

The invention claimed is:

1. An after-market retractable sleeper compartment that is designed to mount to the frame of a Day Cab tractor truck unit, said retractable sleeper compartment comprising:
    (a) mounted wheel bearings running in a linear motion track frame, front and side walls with hinges, a swivel rooftop, an inner fold down floor, and an access door, and
    (b) a retractable Day Cab sleeper compartment having a locking and release handlebar mechanism that allows for retraction or expansion of said compartment.

2. The retractable sleeper compartment unit according to claim 1, wherein said exterior swivel rooftop allows for optional attached HVAC unit.

3. The retractable sleeper compartment unit according to claim 1, wherein said exterior housing allows for space for one or two tractor truck unit exhaust pipes.

4. The retractable sleeper compartment unit according to claim 1, wherein fiberglass composite material is used for the housing, shroud, swivel roof top, side and front walls and fold down floor.

5. The retractable sleeper compartment unit according to claim 1, wherein stainless steel is used for hinges, lock and release handlebar unit, door handle, and door window trim.

6. The retractable sleeper compartment unit according to claim 1, wherein a hardened tempered steel alloy is used for a handle grab bar and footstep.

\* \* \* \* \*